(12) United States Patent
Raber et al.

(10) Patent No.: US 8,622,459 B2
(45) Date of Patent: Jan. 7, 2014

(54) DECK IN A DRAWER

(76) Inventors: Craig Earl Raber, Mannington, WV (US); Karen Sue Raber, Mannington, WV (US)

(*) Notice: Subject to any disclaimer, the term of this patent is extended or adjusted under 35 U.S.C. 154(b) by 164 days.

(21) Appl. No.: 12/928,791

(22) Filed: Dec. 20, 2010

(65) Prior Publication Data

US 2012/0153667 A1 Jun. 21, 2012

(51) Int. Cl.
*B60J 7/00* (2006.01)

(52) U.S. Cl.
USPC ........................................ 296/162; 296/26.13

(58) Field of Classification Search
USPC .............................................. 296/26.13, 162
See application file for complete search history.

(56) References Cited

U.S. PATENT DOCUMENTS

| 5,417,468 | A * | 5/1995 | Baumgartner et al. | 296/162 |
| 6,502,893 | B1 * | 1/2003 | Corliss, Jr. | 296/162 |
| 7,410,205 | B2 * | 8/2008 | Cardwell et al. | 296/162 |

\* cited by examiner

*Primary Examiner* — Joseph Pape

(57) ABSTRACT

A sliding retractable deck assembly is provided for use with recreational-type vehicles. The deck is adapted for use adjacent to and below the vehicle side door and is retractable by sliding back into place under the vehicle so as to be totally out of view and allow total use of vehicle door and all other components of said vehicle. A plurality of individually-adjustable ground-engaging leg members providing at least nine points of support for the deck thus allowing placement of the deck on uneven or sloping ground, while avoiding undue stressing of either the deck assembly or structural components of the vehicle.

4 Claims, 21 Drawing Sheets

FIG.1

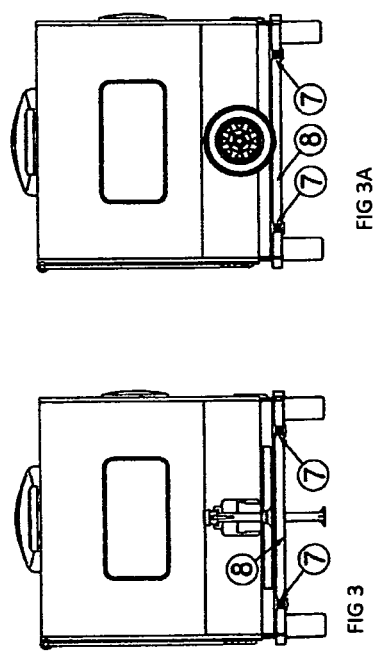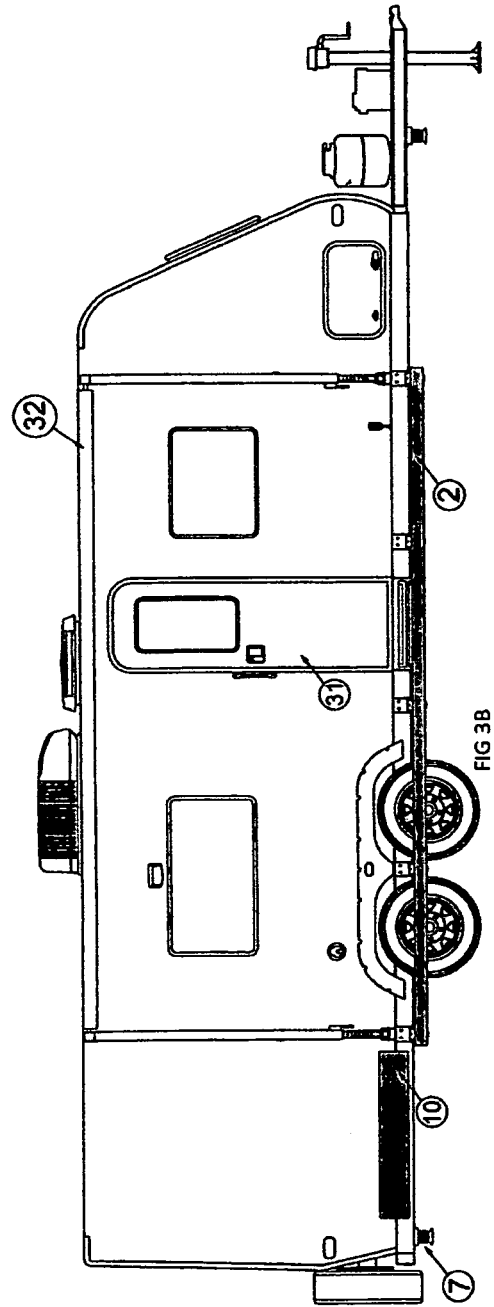

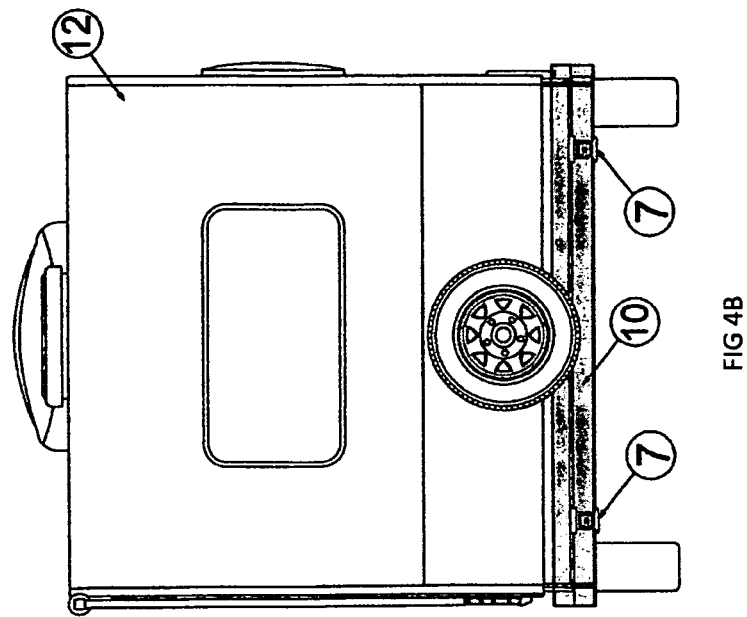
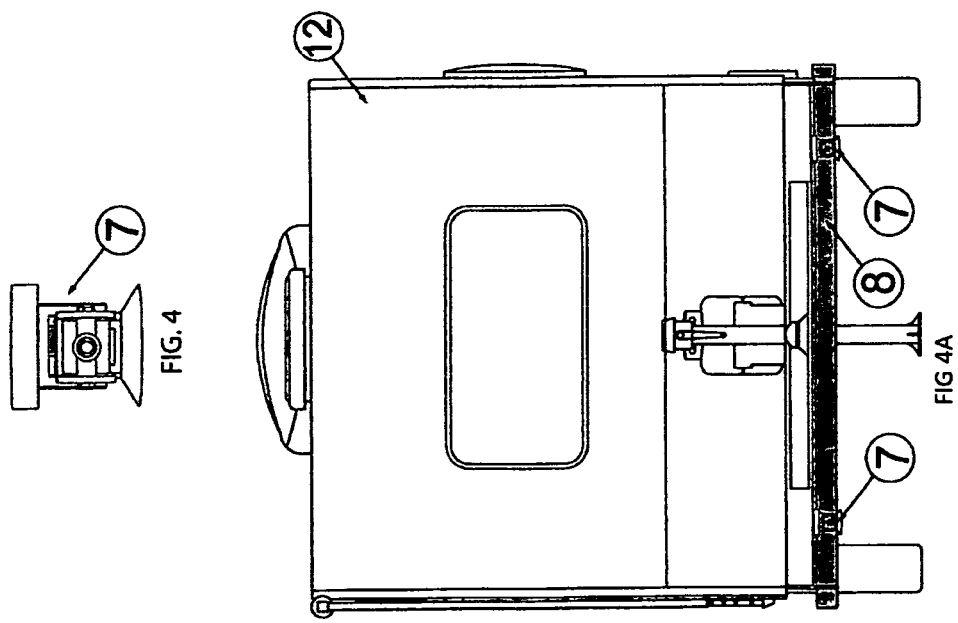

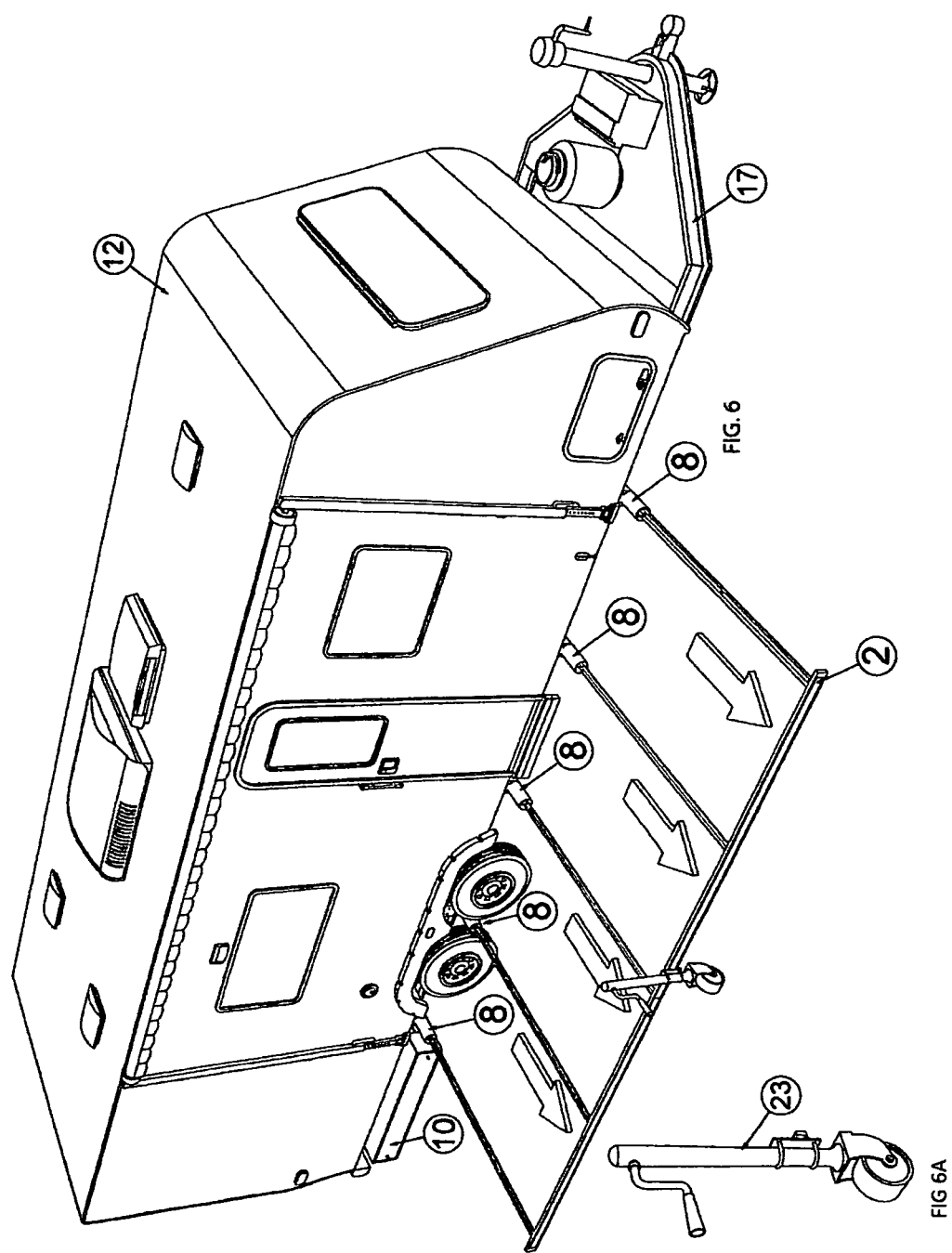

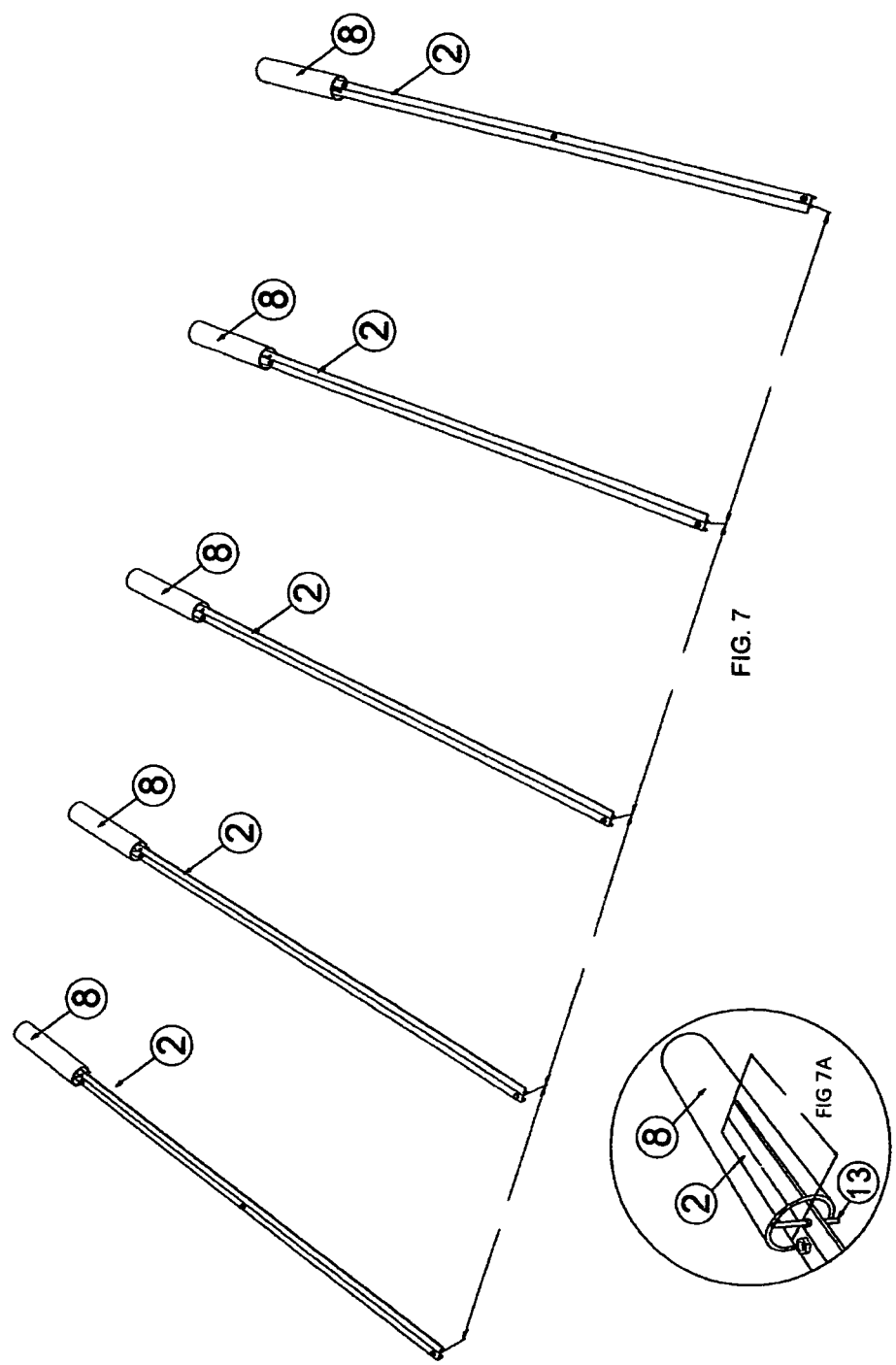

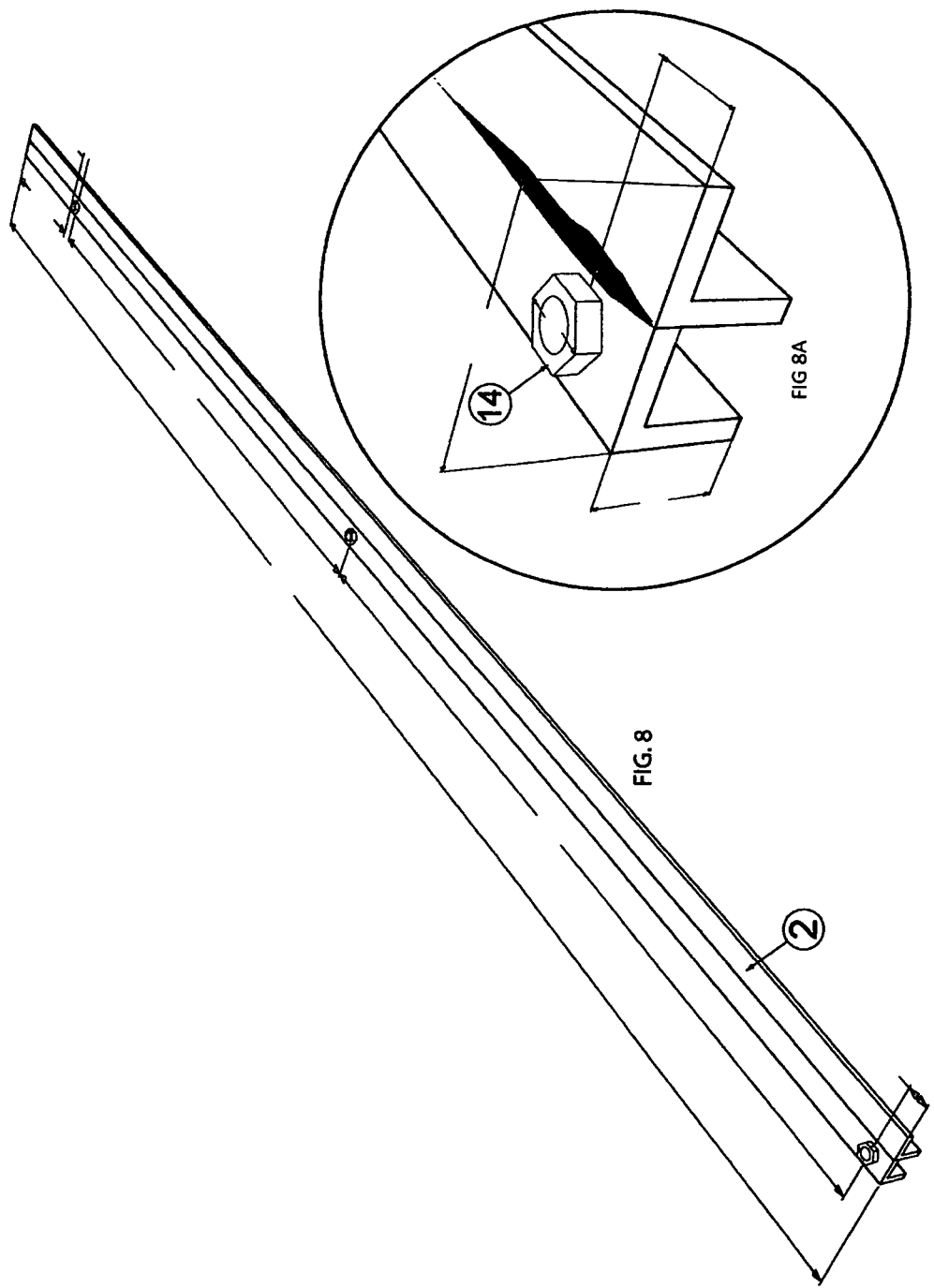

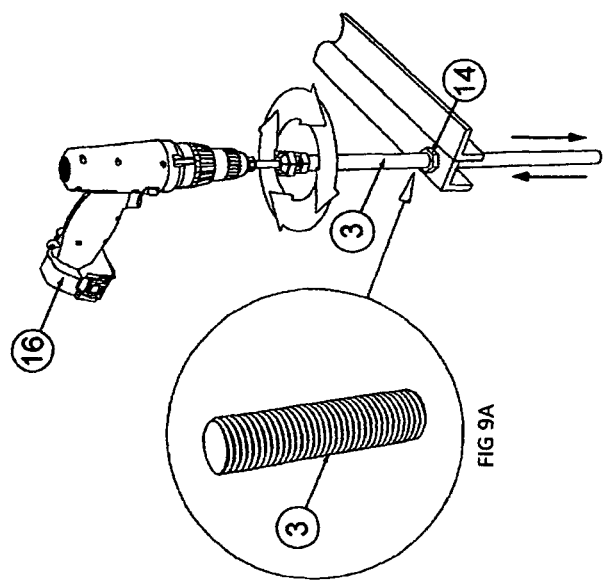
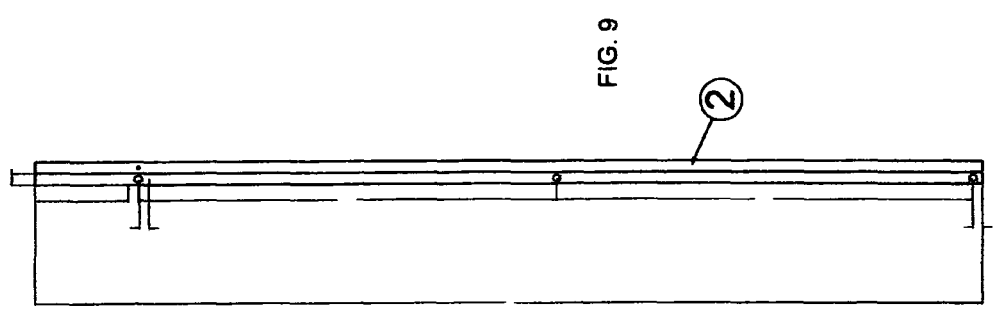

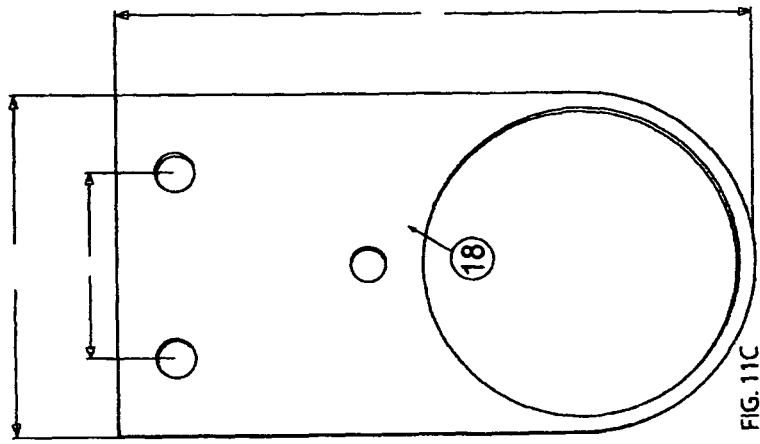
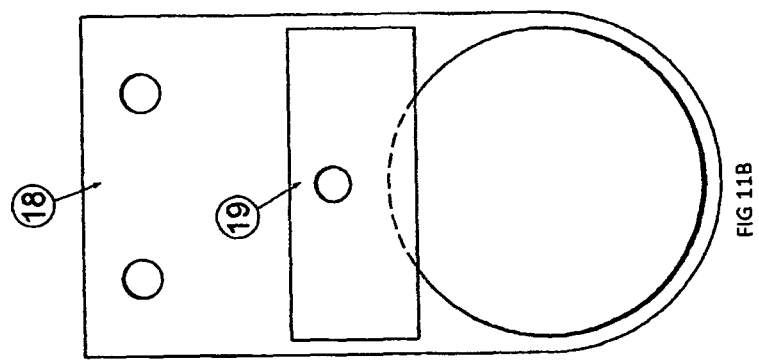
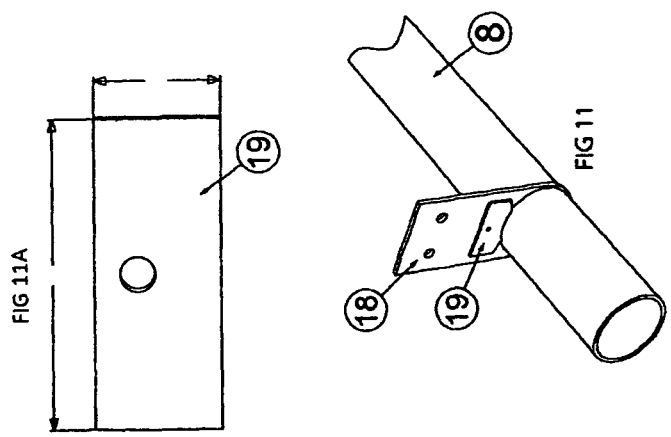

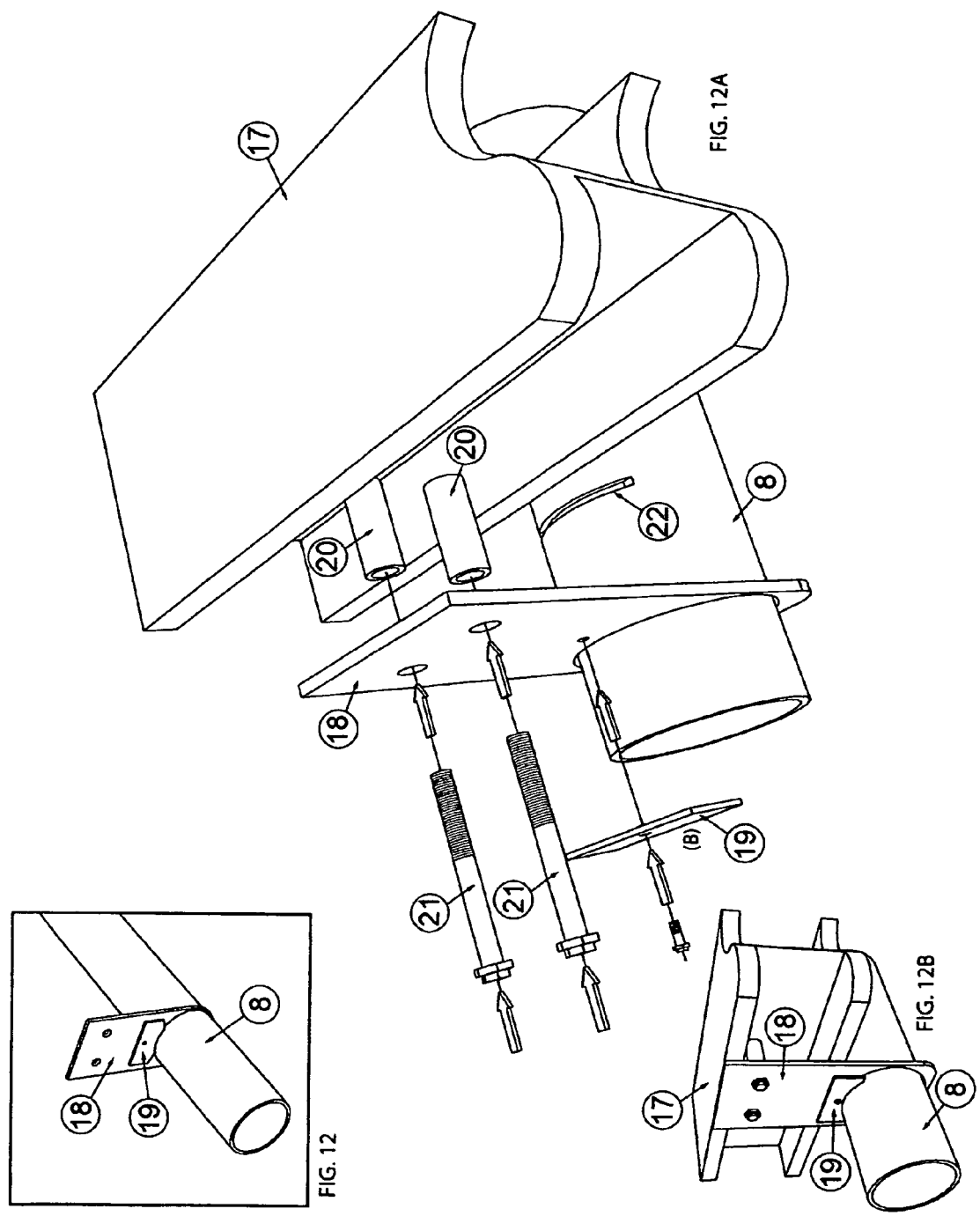

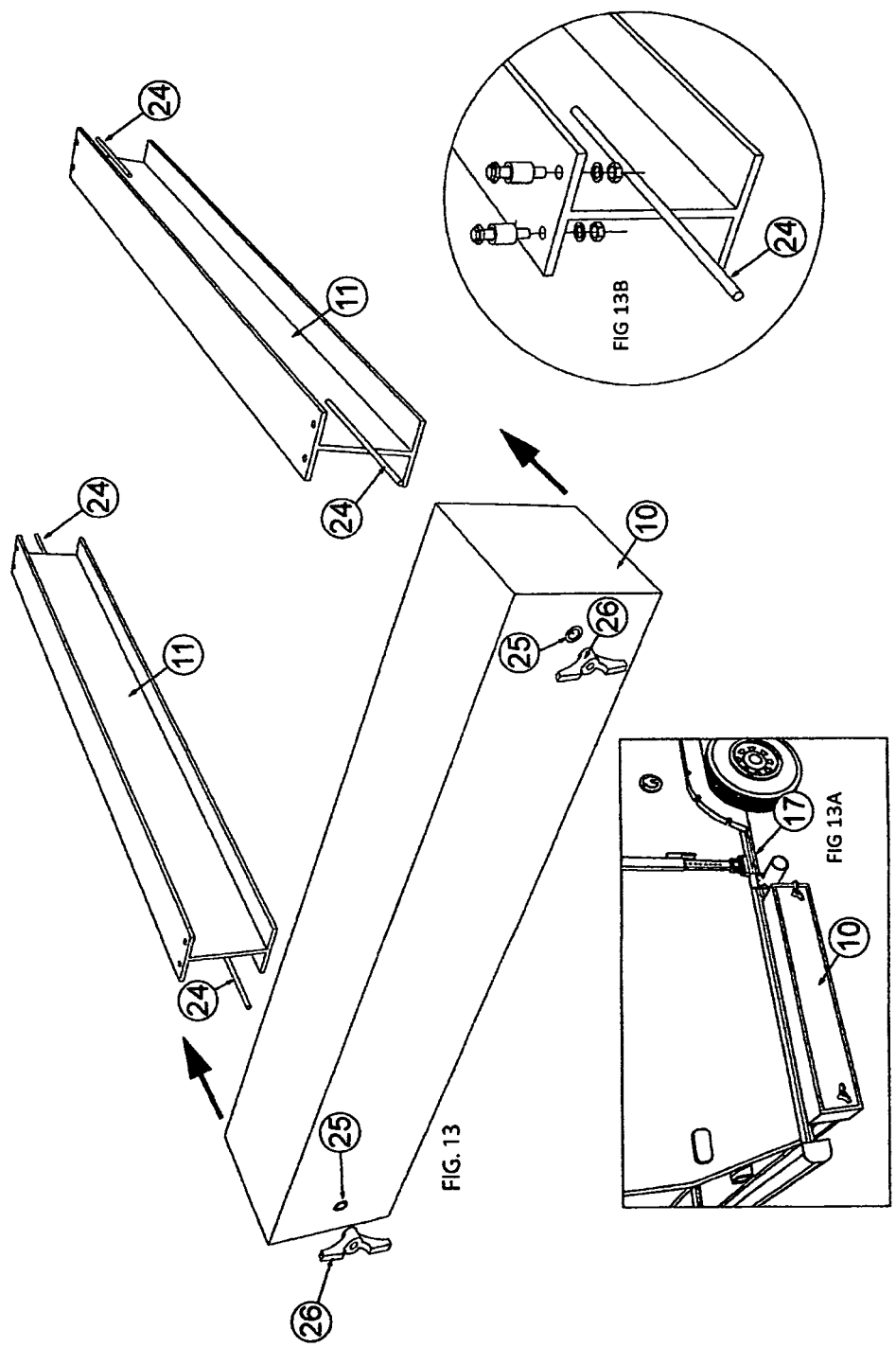

DECK IN A DRAWER

BACKGROUND OF THE INVENTION

This invention relates to retractable structures useful as accessories for recreational vehicles such as motor homes and the like.

More specifically this invention relates to a self storing, sliding, retractable, full size porch or deck assembly from a position of use in front of a recreational vehicle door to a transport position under the vehicle totally out of view and can be built to meet any size vehicle specifications. About four different types of deck or porch extensions for use with recreational vehicles such as motor homes, campers and trailers have been proposed. These all have in common the features of a small floor system for use in a horizontal position and folded or retracted to a stored or transportable position.

One common approach used in the construction is to build a small unit to be placed in position but not attached to the vehicle and can be disassembled and stored inside the vehicle as shown in the prior art, U.S. Pat. No. 7,500,335.

Another approach is to have the constructed floor attached by a hinge support and -for use in a horizontal position then -folded to the side of-the vehicle and attached, for storage and transport, thus adding to the size of the vehicle as shown in prior art, U.S. Pat. No. 6,799,833.

SUMMARY OF THE INVENTION

This invention provides for a retractable, sliding deck assembly particularly adapted for use adjacent the side door of a motor home, camper trailer or similar type of vehicle. The deck floor framing is adapted to be attached to the undercarriage of the vehicle and is retractable by sliding to a transport position and kept out of view and kept secure for safe transport. Ten inches of the railing system is kept inside of the undercarriage stowage system for added support and strength of the deck railing assembly. The floor assembly components are stored in a drawer also attached to the undercarriage of the vehicle. The drawer is constructed to carryall the flooring components and also be transported safely to any destination and out of view in a very convenient location. The size of this invention can be changed easily to accommodate any size of travel trailer or recreational vehicle. Nine leg stabilizers are used to provide multi-point leveling and support to the deck assembly. One inch diameter all thread bolts are used to quickly level and support the deck railing system, and can be adjusted to any height to accommodate for uneven or sloping ground surfaces. Decorative piping is used to disguise the all thread adjustable legs of the assembly. Decorative lights and railings are strung between piping for an enclosure to the deck.

It is the object of this invention to provide a large deck assembly for a recreational vehicles of any size.

Another object of this invention is to provide a large deck for recreational vehicles adopted for use on uneven or sloping ground, with respect to the condition of ground whether it be wet or dry, gravel or sand, paved or cement.

Yet another object of this invention is to provide increased support and rigidity to the floor platform of a movable deck assembly.

Still another object of this invention is to provide a decking assembly that can be assembled by one person in a minimal amount of time.

BRIEF DESCRIPTION OF THE DRAWINGS

FIGS. 3, 3A, and 3B is a perspective view of the deck in a drawer assembly as it relates to the actual vehicle to which it is attached.

FIGS. 4, 4A, and 4B is a view of the clearance specifications of the deck in a drawer in perspective of the recreational type vehicle to which it is attached.

FIGS. 6, and 6A is a perspective view of the rail system set up to show it is slid out of the tube system with one swivel trailer jack.

FIGS. 7, and 7A is the rail system detail and spacing of rails.

FIGS. 8, and 8A is an exploded view of the rail system dimension detail.

FIGS. 9, and 9A is a further exploded view of rail system detail of how the leg system is attached.

FIGS. 11, 11A, 11B, and 11C is an exploded view of the PVC pipe carrier bracket detail.

FIGS. 12, 12A, 12B is an exploded view of the rail carrier bracket mount details and its attachment to recreational vehicles.

FIGS. 13, 13A, and 13B is a perspective view of the box cover and framing details of the drawer assembly.

FIGS. 20, 20A, and 20B is a perspective view of the stabilizer leg layout.

DETAILED DESCRIPTIONS OF THE DRAWINGS

Figure 1:
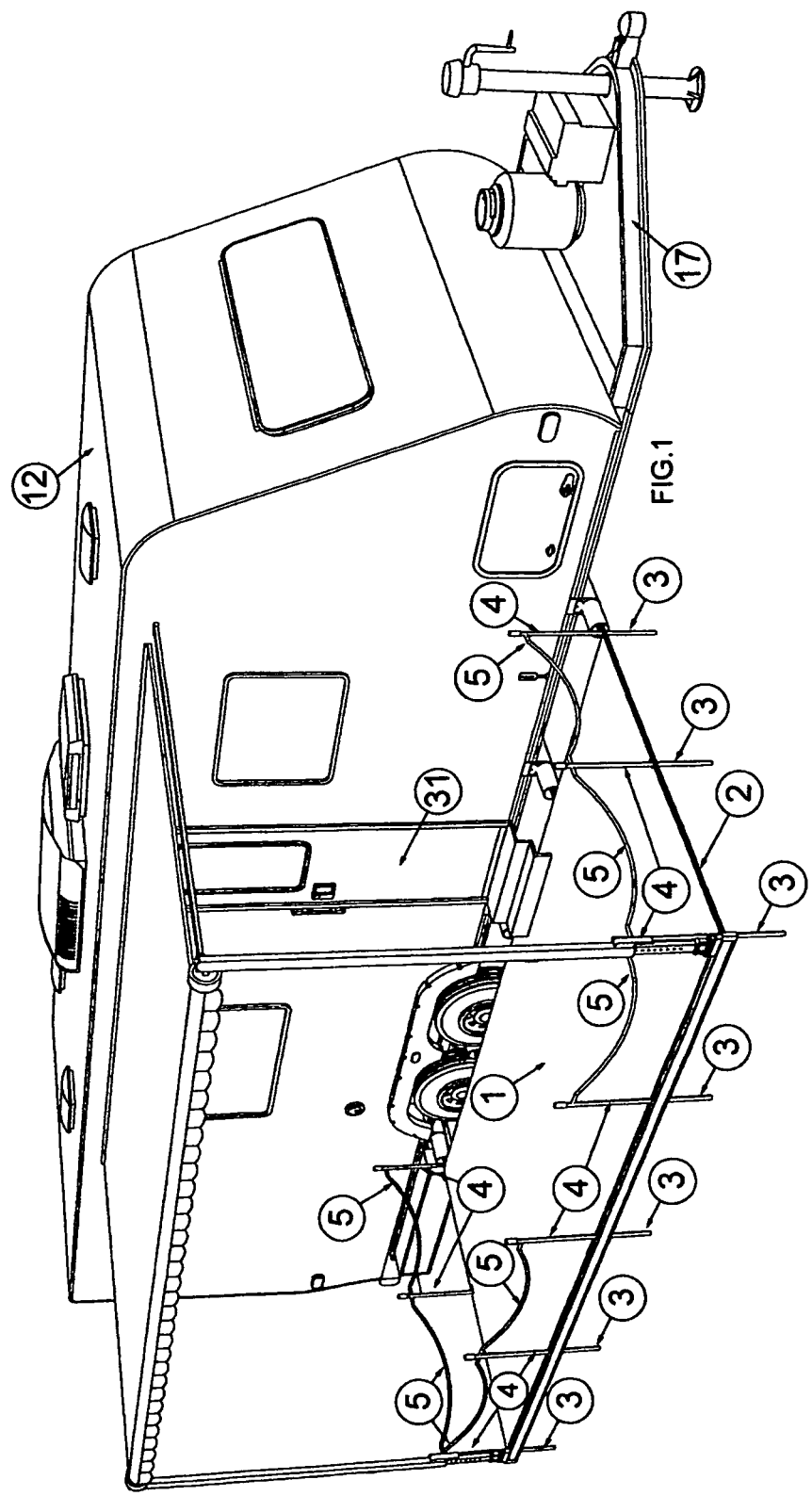
FIG. 1 is a perspective view of the deck assembly of this invention in its open or use position.

FIG. 1 is the deck assembly, designated generally adjacent to the side door 31 of the recreational vehicle 12, is shown in open or use position. The deck assembly comprised a floor platform 1 having a structural framework 2 supporting its three layers of flooring 1; comprised of aluminum decking 28 as first layer, plywood 27 is the second layer and decorative outdoor carpet 29 as third layer.

A plurality of ground-engaging leg assemblies 3 to support the platform and are individually adjustable to accommodate use on sloping or uneven ground. Details of leg construction 3 are shown in FIG. 9 of drawings. Each leg support 3 extends to the top of deck floor assembly 1 is covered with decorative PVC pipe 4 and then a decorative plastic chain 5 is strung from pipe to pipe for a decorative enclosure.

Figure 2:
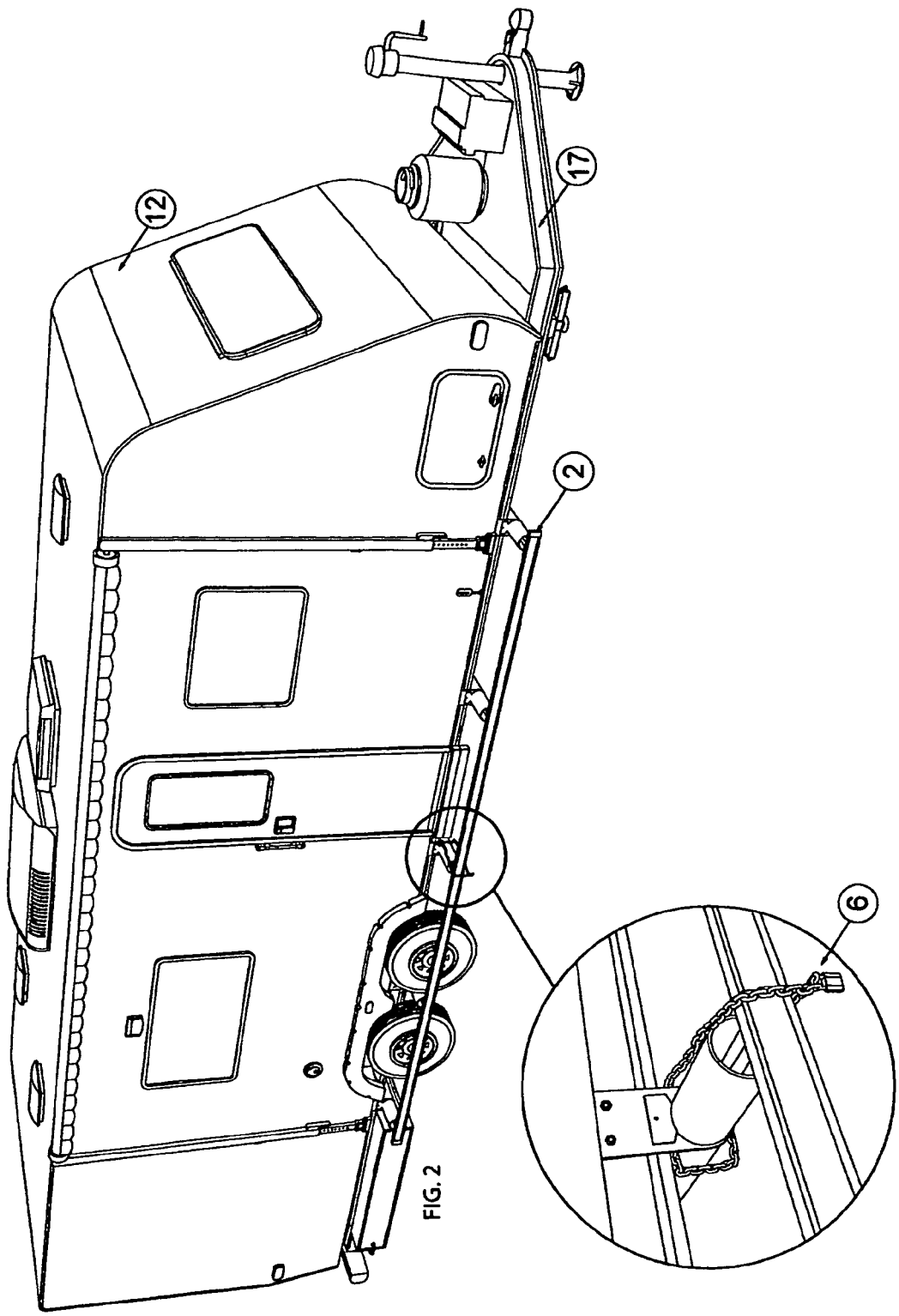
FIG. 2 is a perspective view of the deck railing system in its travel or carrier position.

FIG. 2 illustrates the deck rail assembly 2 in its stowed position adjacent and parallel to the side of, and slid under the recreational vehicle 12 it is attached to. The rail system 2 is locked into position for travel by a chain or cable 6 attached to the frame of the vehicle 17 as shown.

FIG. 3 illustrates front, FIG. 3A illustrates back, and FIG. 3B illustrates side view of the recreational vehicle clearance specifications. Deck carrier system 8 will not exceed factory installed devices such as stabilizer jacks 7 in the fully retracted position. The drawer box assembly 10 will not hang below factory installed devices 7. The deck rail 2 and carrier system 8 will not extend in width past any factory installed devices 7 such as the awning assembly 32. The carrier 8 and drawer assembly 10 size and spacing is determined by the specifications set forth by the factory installed devices and actual size of the vehicle. The total weight of this invention is 425 pounds and will not cause any undo stress to the vehicle itself. This invention is designed for the deck and drawer size to be adjusted to work with any size recreational vehicle.

FIG. 4 an illustrated view of the factory installed stabilizer jacks 7 in a fully retracted position, 4A an illustration of the front view of the recreational vehicle 12 with the factory installed stabilizer jack 7 in full extension. FIG. 4C further illustrates that the invention was created to exist easily within the vehicles 12 set size and factory installed components. Further, this invention was created to accommodate any size vehicle in use today.

Figure 5:
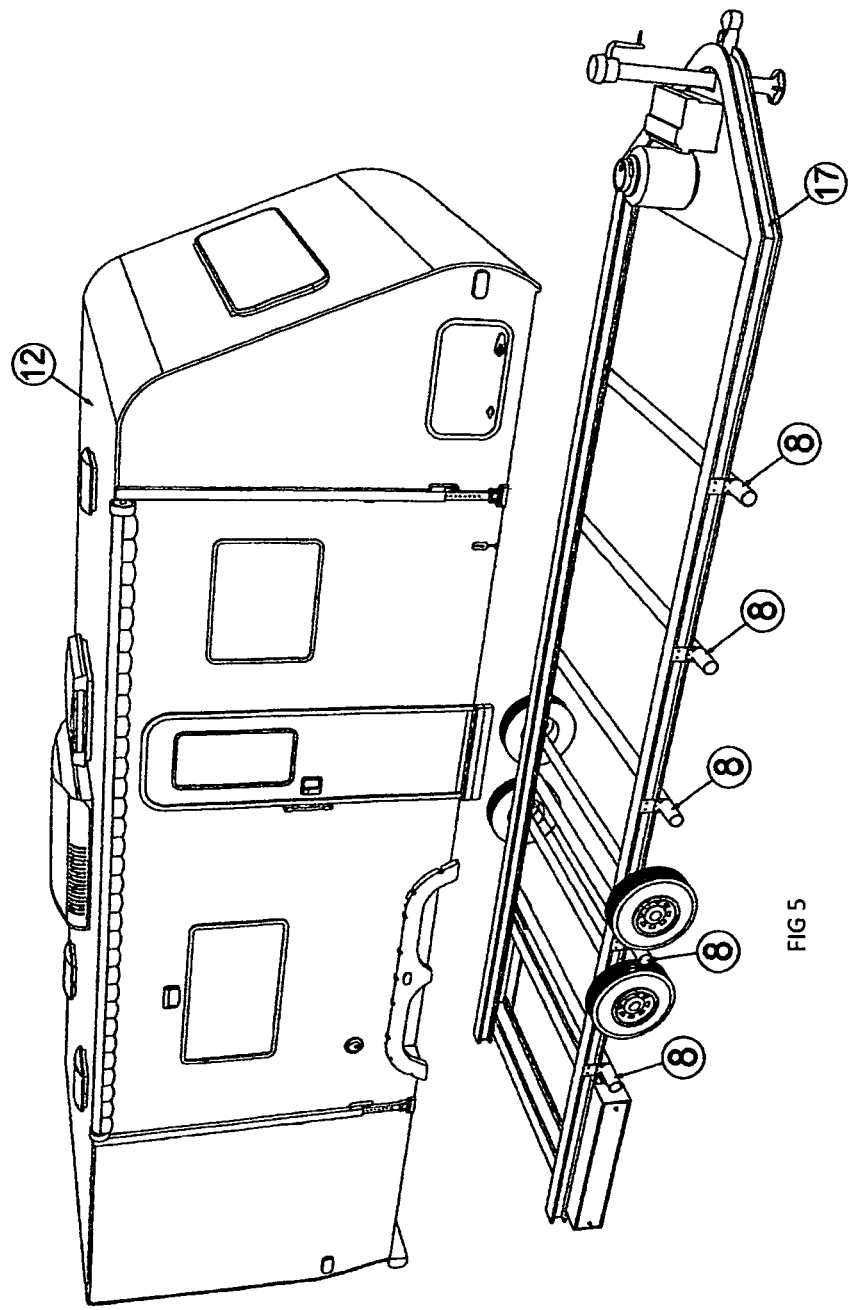
FIG. 5 is an exploded view of the rail carrier tube system with the shell of the vehicle removed for clarity.

FIG. 5 illustrates the bracket and carrier tube system 8 and how it is attached to the frame 17 of the vehicle itself. The shell of the vehicle was removed for clarity.

FIG. 6 illustrates how the rail system 2 is set up with the use of a swivel trailer jack 23. The rail frame system 2 is lifted and pulled from its stowed position by attaching a swivel trailer jack 23 to the front rail of the frame support system 2. This invention was designed to be set up by one person in a minimal amount of time on any terrain.

FIG. 7 illustrates an exploded view of the rail support system 2 construction. The rail carrier pipes 8 are spaced typically 4 feet apart and the rail system 2 is constructed to slide in and out of the carrier pipes 8 with ease. Ten inches of the rail is maintained inside the pipe carrier 8 for support of the deck rail assembly 2 as illustrated. The rail 2 is equipped with a drive pin 13 to prevent the rail 2 from sliding in the pipe carrier 8. Pipe carrier 8 is further detailed on FIG. 10 of the drawings.

FIG. 8 illustrates the rail system 2 dimension details. Each rail 2 is constructed of two metal rails welded in length together to form one rail with the dimensions of 1¼ inch high and 2 Yz inch wide and 8 feet 5 inches long. The two outermost rails one on the left and one on the right of the deck rail assembly 2 is drilled and equipped with a 1 inch center nut 14 as shown, welded in placed used for stabilizing and leveling leg members 3.

FIG. 9 illustrates further the rail system 2 stabilizing and leveling bar 3 used for adjustable legs. Each outer rail 2 is drilled and a 1 inch nut 14 is welded into place using uniform spacing. The nuts 14 are placed 3 feet 8 Yz inches apart on the outer rails only. One inch in diameter all thread material bolt 3, as shown, is used to stabilize and level the deck rail frame assembly 2. Each stabilizer bar 3 is equipped for use with a hand drill 16 to be screwed into place at any height for leveling of the deck.

Figure 10:
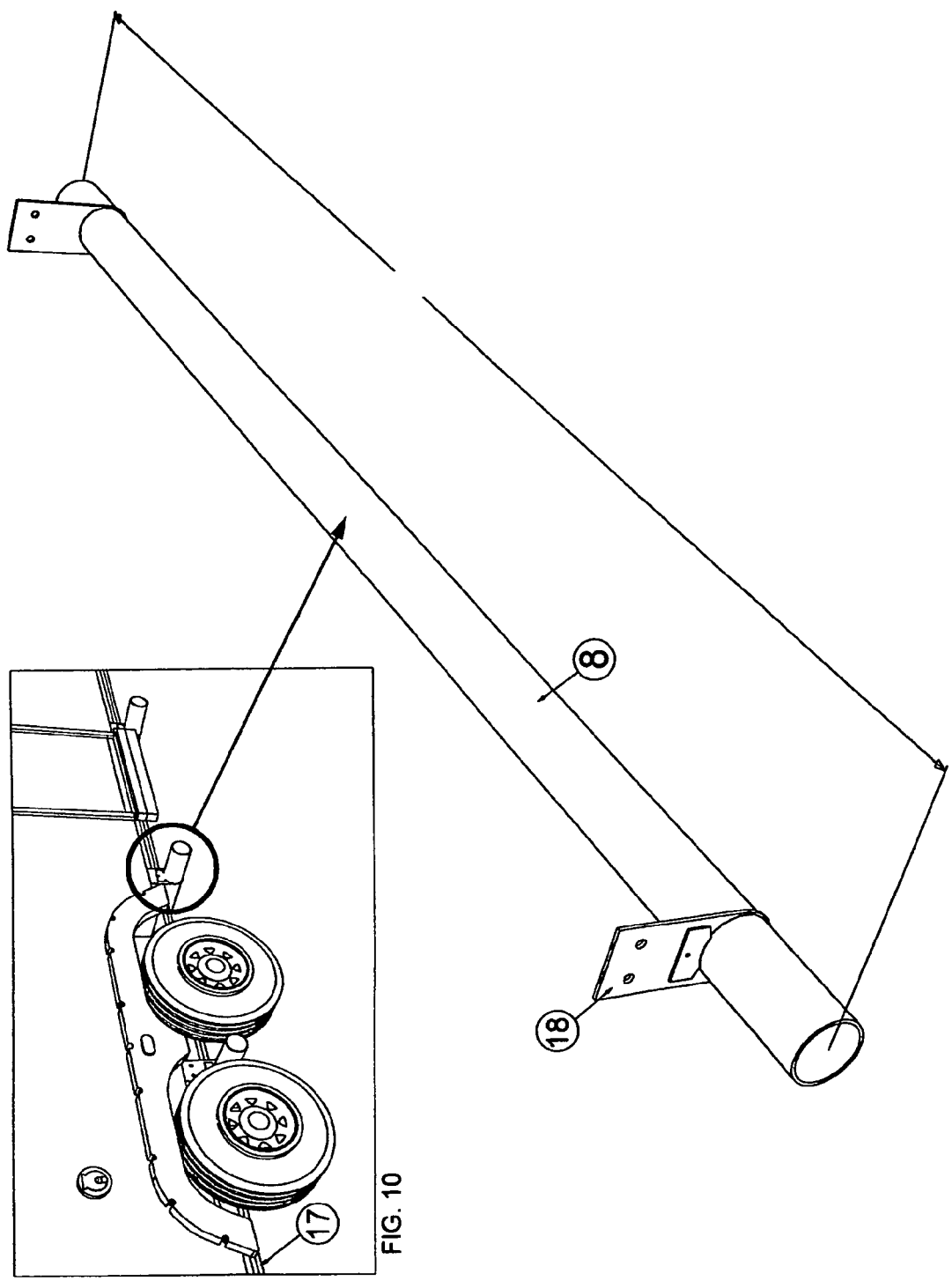
FIG. 10 is an exploded view of the PVC pipe carrier system.

FIG. 10 illustrates the use of 3 inch in diameter PVC pipe used as rail carrier system 8. Each PVC pipe 8 is set up in typical 4 foot spacing and is attached to the recreational vehicle 12 model frame 17. The PVC pipe 8 is 3 inches in diameter and, for our invention, is 100 inches long, however each pipe length will be determined by the width of the vehicle in use. Each pipe is attached to the vehicle frame 17 with a bracket 18 bolted in place; this is further illustrated in FIG. 11.

FIG. 11 illustrates the PVC pipe carrier brackets 18 in detail. Each bracket 18 is made from ¹⁄₁₆ inch thick metal material and is made with a 3 inch diameter hole for the PVC pipe 8 to slide into. In addition to the 3 inch hole 2 smaller ⅝ inch holes are drilled at the top of bracket 18 for the bracket to be bolted to the frame of the recreational vehicle as shown. A third ⅝ inch hole is also drilled for a small metal plate 19.5 inches wide and 2 inches high, used -to stabilize the PVC pipe 8 and prevent slippage as shown.

FIGS. 12, 12A, and 12B illustrate how the rail carrier bracket system 18 is mounted to the existing metal frame 17 of the vehicle 12. FIG. 12A illustrates how pipe spacers 20 are used to mount bracket 18 to existing frame 17 to eliminate any vibrations during transport. The bracket 18 is then bolted securely using self tapping bolts 21. The PVC pipe 8 is slid into place and a small cut 22 is made for the plate 19 to prevent slippage of pipe carrier 8.

FIG. 13 illustrates drawer box cover 10 and framing details and dimensions. Two "I" beams 11 are bolted to existing frame 17 of vehicle 4 feet Y2 inch apart from each other to be used as a drawer for stowage of flooring materials 1. Each "I" beam 11 has a ⅝ inch all thread bolt material 24 welded to the outside of the beam extending past the front and rear of beam 11 for the box cover 10 to attach as shown. Each "I" beam 11 is 8 inches high and 6 feet long. The box cover 19 is constructed of wood painted black with its dimensions being 4 feet 7 inches in width, 9 Y4 inches high and 9 Y2 inches deep with 2 holes 25 drilled in front spaced 4 feet 1⅝ inches apart and slid onto exposed all thread material 24 and secured with ⅝ inch wing nuts 26 as shown in FIG. 13. The box cover 10 is constructed and designed to cover and secure the materials that is stored in the drawer. In like manner, the rear of the drawer is covered in the same fashion as the front.

Figure 14:
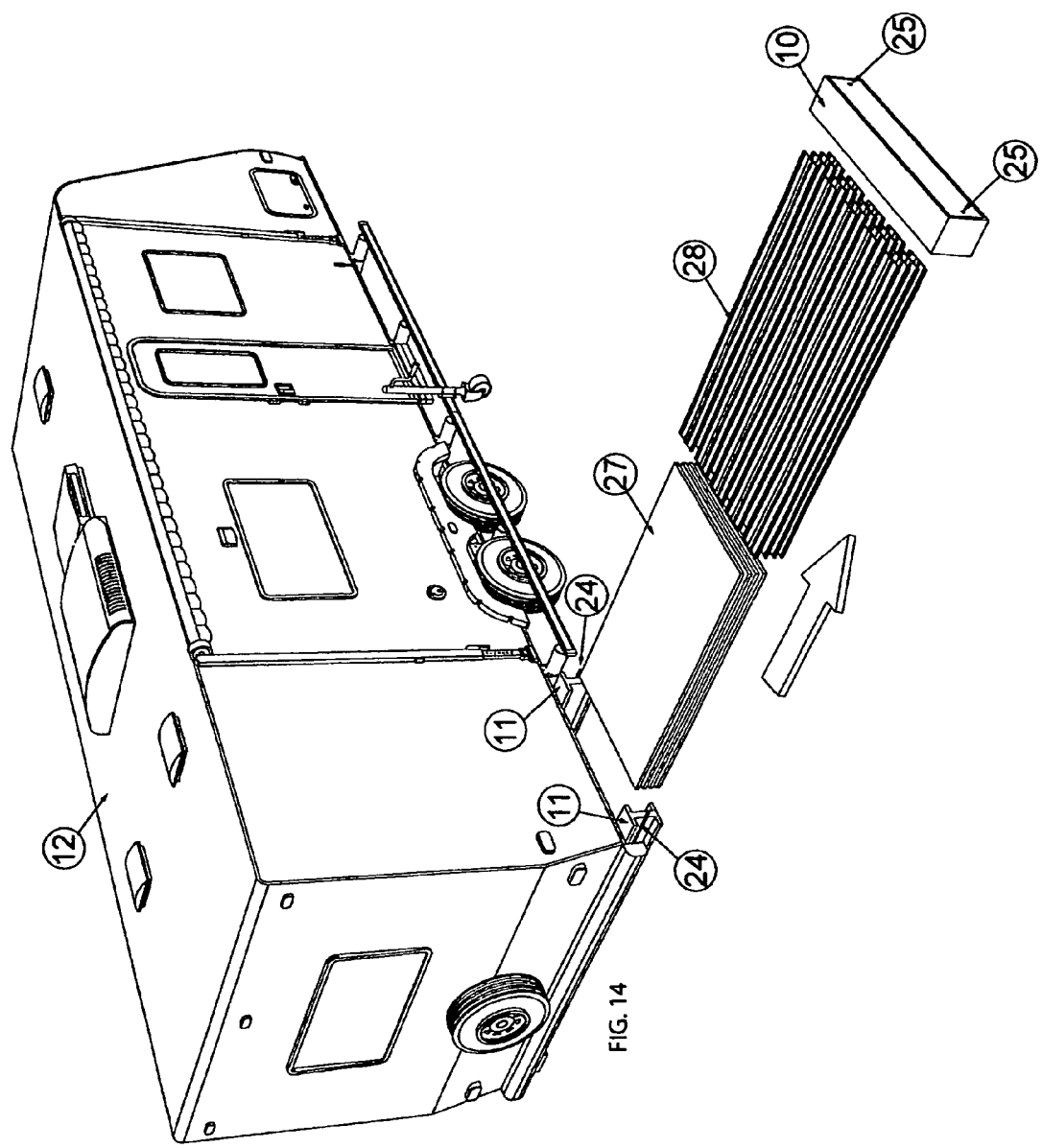
FIG. 14, is an exploded view of the drawer carrier content detail.

FIG. 14 illustrates the materials 27128 that are being stored in the drawer during transport.

The first layer is the 4 units of 4 feet wide and 7 feet 6 inches long sheets of plywood 27; this is used as the second layer of deck flooring 1. Then placed directly on top and placed in an orderly manner 20 units of 8 feet long and 8⅝ inch wide aluminum decking 28 that is used as the base layer of deck flooring 1 material.

Figure 15:
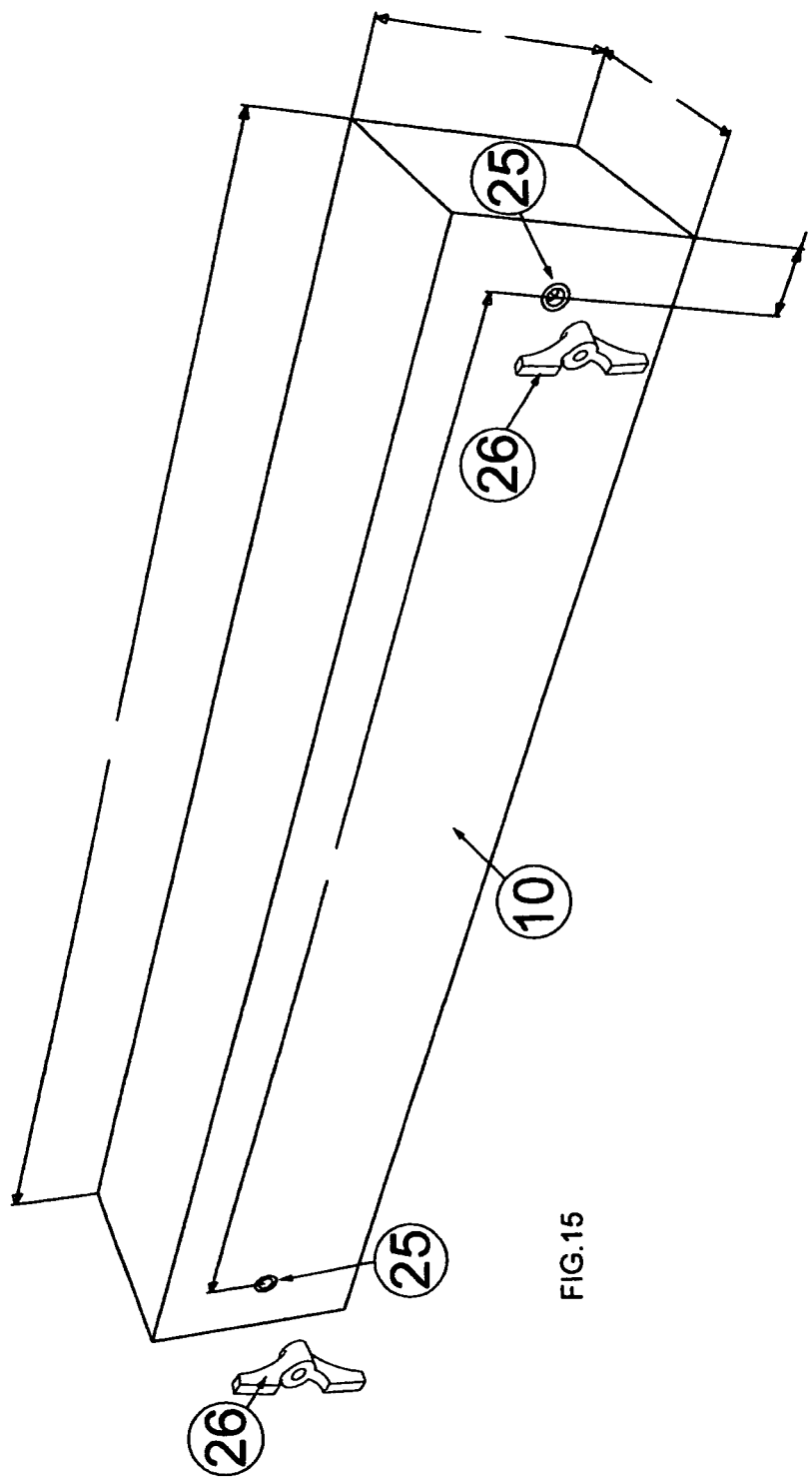
FIG. 15 is a perspective view of the drawer box cover detail.

FIG. 15 illustrates -the use of the drawer box cover 10 and how it is attached to drawer I beams 11 using wing nuts 26 to secure it. The wing nuts 26 also allow for easy removal.

Figure 16:
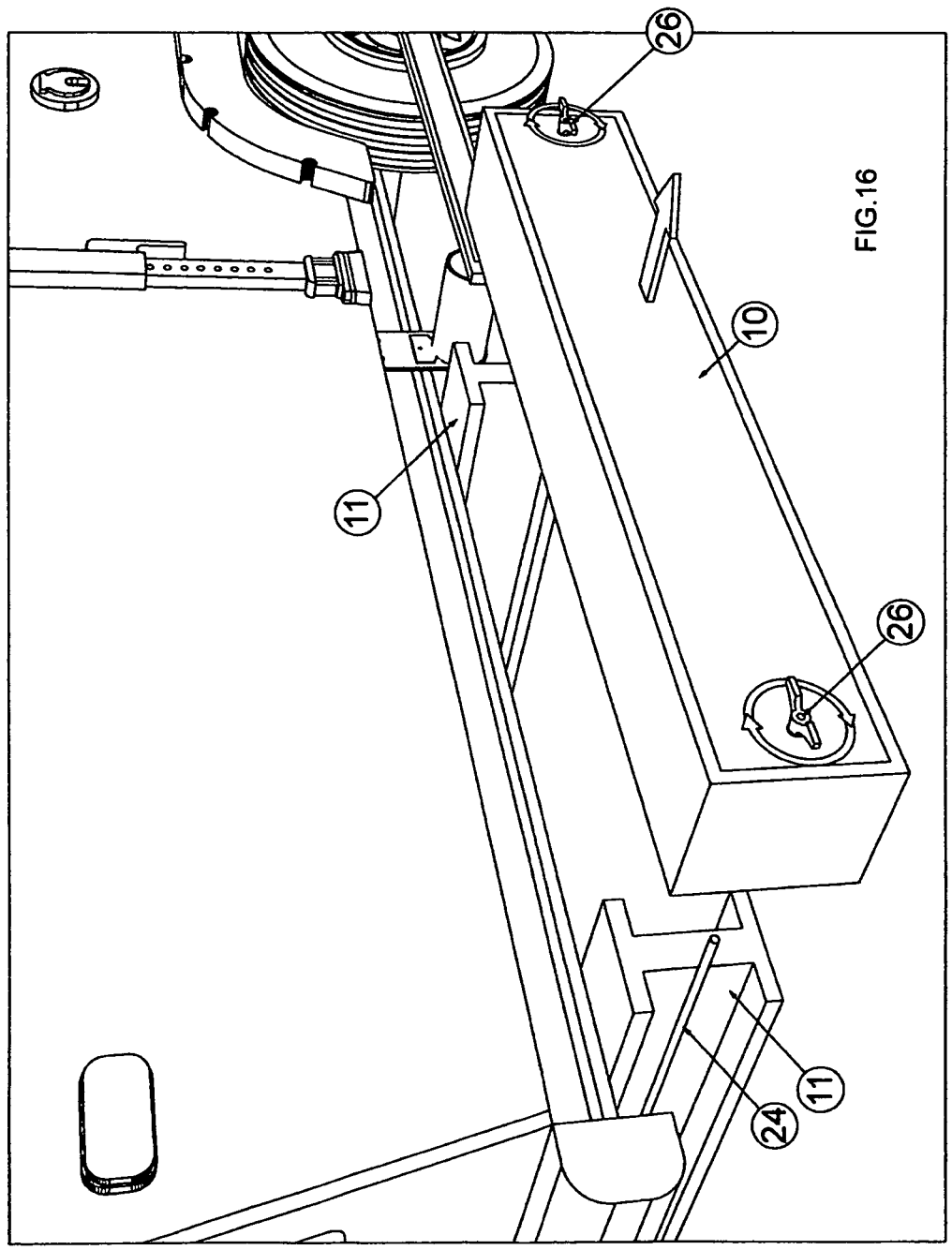
FIG. 16 is a perspective view of the drawer box mounting detail.

FIG. 16 further illustrates the box carrier drawer cover 10 is slid over I beams 11 and all thread material 24 that is welded to outside of each I beam 11 and held securely in place with wing nuts 26 designed for ease of use.

Figure 17:
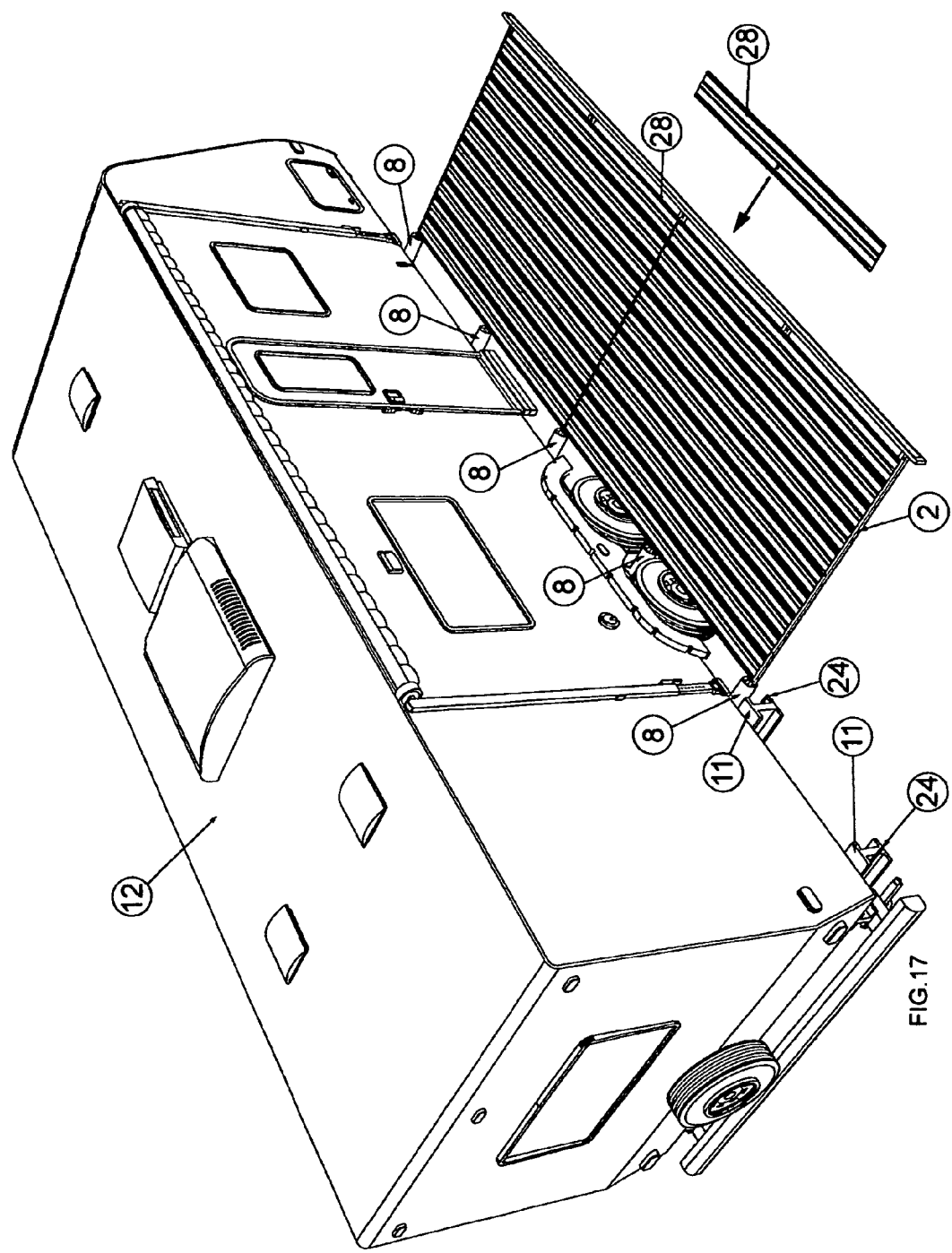
FIG. 17 is a perspective view on the aluminum floor layout of the deck.

FIG. 17 illustrates the use of the 20 units of 8 feet long by 8⅝ inch wide aluminum decking material 28 placed in a horizontal position with the longest side from left to right of deck, this is the first layer of deck flooring. This aluminum decking 28 was utilized in this invention for a stronger more stable surface than most wood only decking material.

Figure 18:
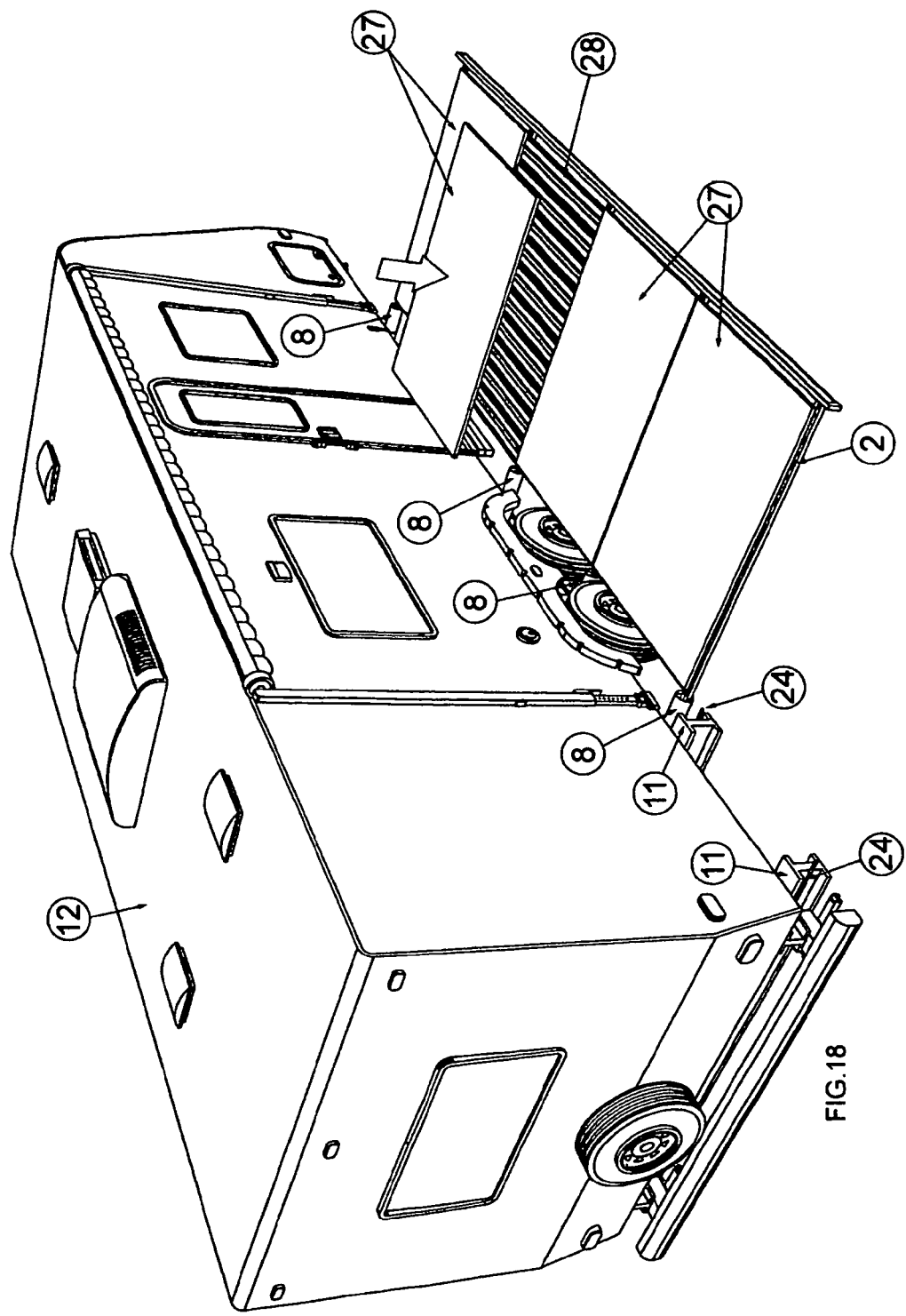
FIG. 18 is a perspective view on the plywood flooring layout of the deck.

FIG. 18 is an illustration of the use of the plywood 27 flooring layout. The 4 units of 4 feet wide and 7 feet 6 inch long sheets of~inch thick plywood 27 are placed in a horizontal position with the longest side placed front to back for extra support. All materials were designed, in this invention, for ease of placement and removal and storage all done by one person.

Figure 19:
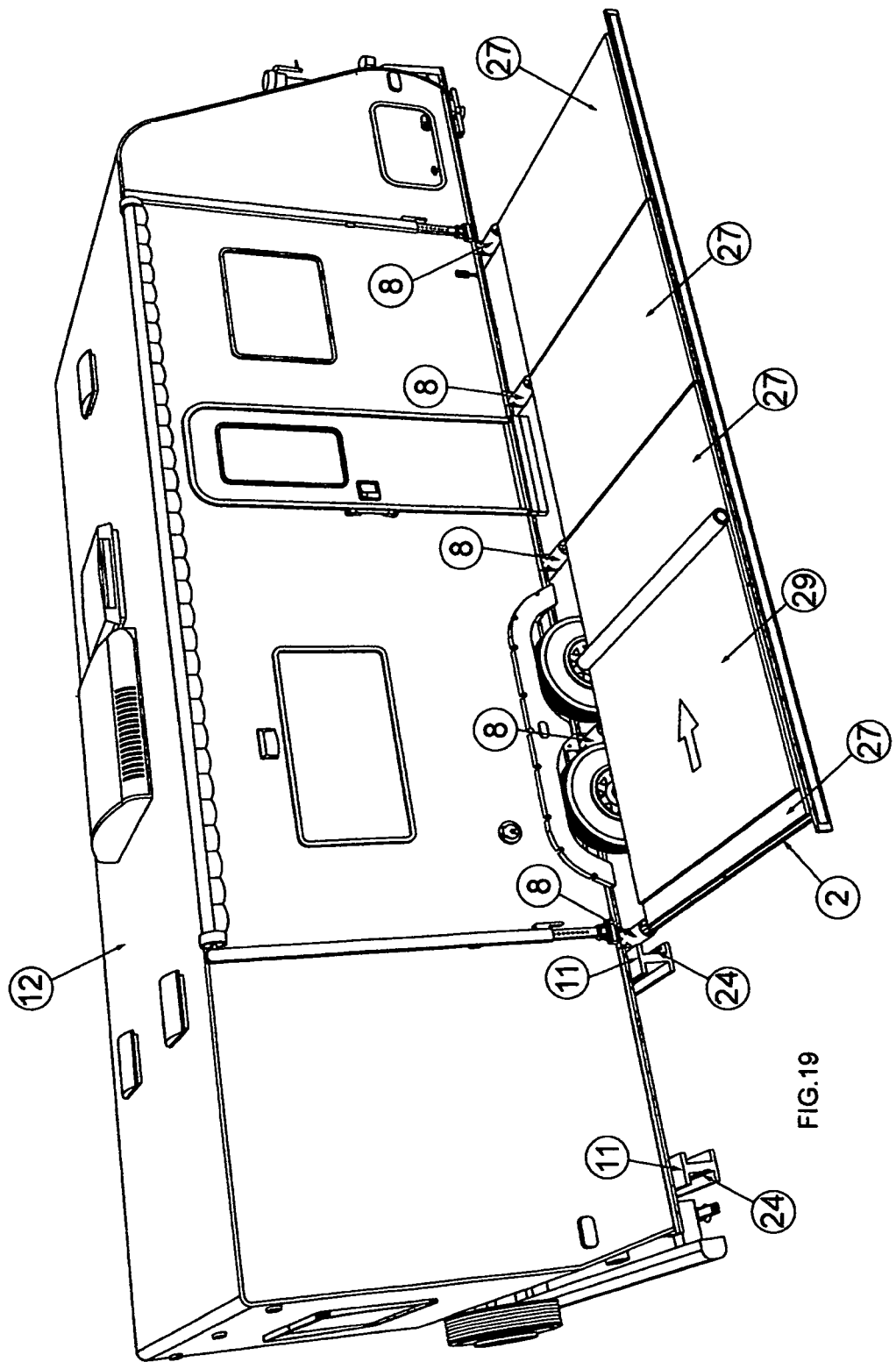
FIG. 19 is a perspective view of the carpet flooring layout.

FIG. 19 illustrates the use of an outdoor type carpet 29 trimmed to fit deck in the [mal stage of set up. The carpet 29 was used in this invention for ease and beautifying the deck. The carpet size and color will be determined by the actual size of deck and color of recreational vehicle 12.

Figure 20:
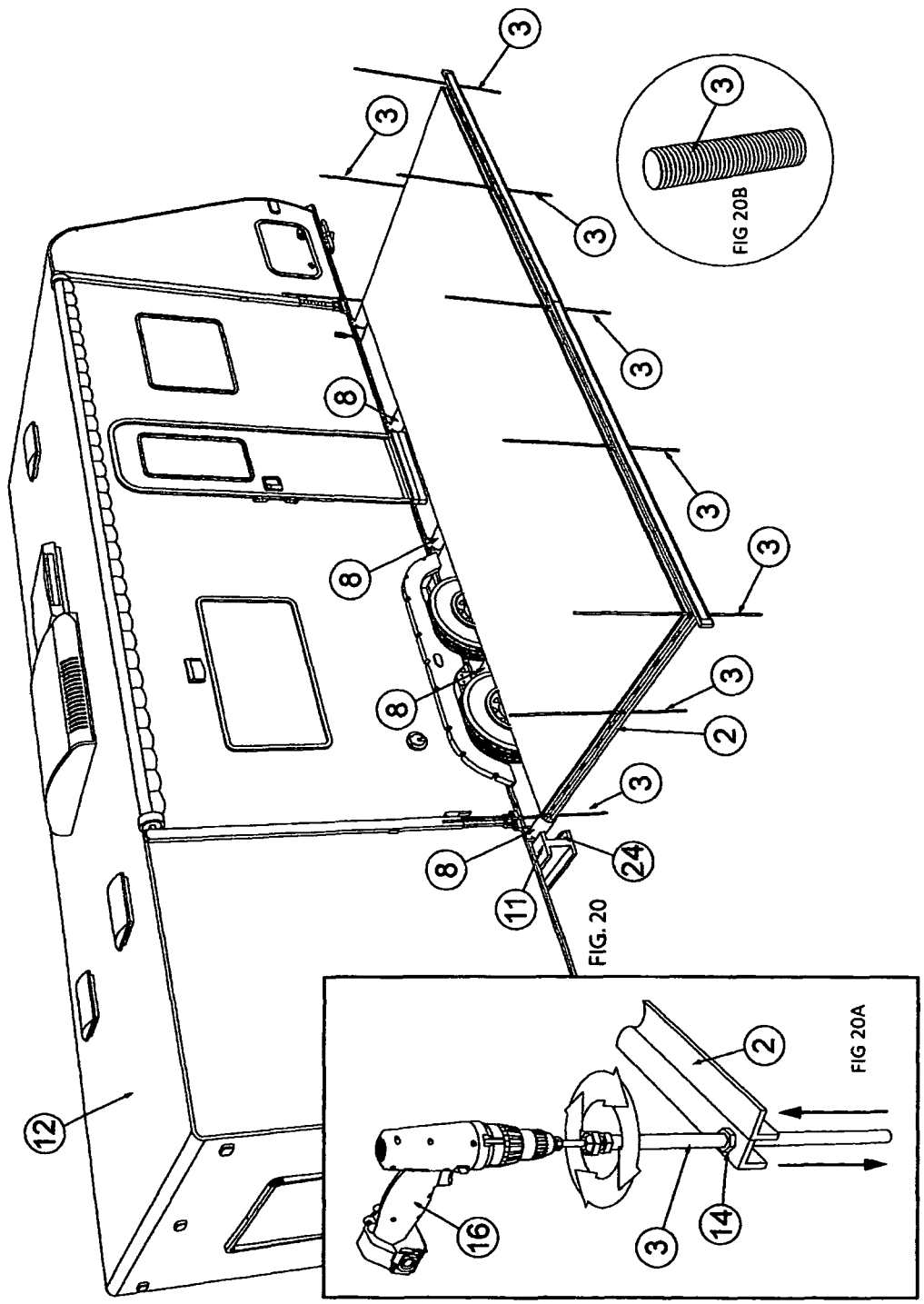

FIG. 20 further illustrates the layout of the stabilizer bars 3 used to level the deck assembly. Each stabilizer bar is attached to a drill and screwed to the correct height to make the deck level. Again, this will accommodate any type of terrain.

Figure 21:
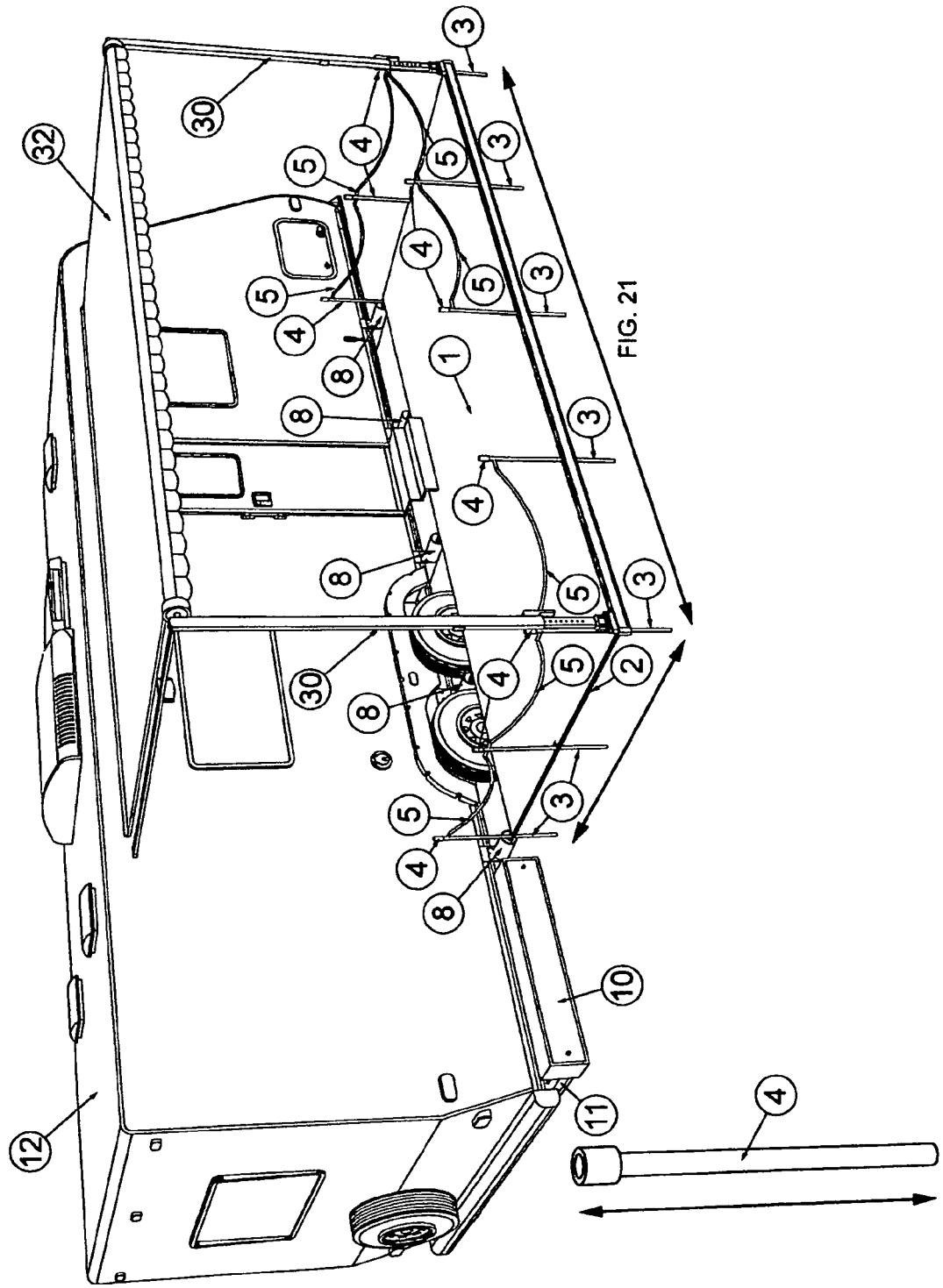
FIG. 21 is a perspective view of the Deck in a Drawer final view.

FIG. 21 illustrates the final view of the Deck in a Drawer invention. The stabilizer bars 3 are decoratively covered with a 1¼ inch in diameter 3 feet long PVC tube and cap 4.

The invention of the decorative stabilizer bar covers 4 also serves as a decorative pole for use with a decorative plastic chain 5 to accent the finished deck as a decorative enclosure. This invention also represents a way to use the existing awning system 32 of the recreational vehicle 12. The poles of the awning 30 are attached to the deck using the corner stabilizing bars 3.

In a typical commercial embodiment of this invention, the floor platform 1 may be any size as determined by the size of the recreational vehicle 12 it is attached to. Structural materials were chosen to conserve weight and ease of operation and assembly. The leg and stabilizer bar members 3 are adjustable to any vertical position to accommodate for multiple terrain applications. In a retracted and stowed position the deck and drawer assemblies add no additional width or length to the vehicle 12. All carrier components 8 are kept with the dimensions of the recreational vehicle 12 to be safely and securely transported from place to place. Because of the ease of use and light weight of this invention it is designed to be operated and assembled by one person in a minimal amount of time (about 15 minutes) from a stowed position to a fully functional deck.

We claim:

1. A deck assembly for a trailer having rear wheels, the deck assembly comprising:
    a carrier assembly coupled to an underside of the trailer, the carrier system including a plurality of pipes extending transverse to the trailer, at least one of said plurality of pipes located forward of the rear wheels of the trailer and one of said plurality of pipes located rearward of the rear wheels,
    a frame support assembly slidably associated with the carrier system, the frame support system including a plurality of frame members which are slidably received in said plurality of pipes for extension and retraction thereof in a transverse direction relative to the trailer, the frame support assembly also including a longitudinally extending rail member fixedly connected to the outer ends of each of the plurality of frame members,
    a swivel trailer jack attached to the longitudinally extending rail member including a wheel for assisting the extension and retraction of the frame support assembly,
    a plurality of support legs connected to the frame support assembly for supporting the deck assembly when extended,
    a deck comprising a plurality of removable deck members, and
    a drawer formed by a plurality of transversely extending I-beams coupled to the underside of the trailer at a position rearward of the rear wheels,
    wherein the plurality of removable deck members are stored in the drawer when the deck assembly is retracted and are removed from the drawer and positioned on the frame support assembly when the deck assembly is extended.

2. The deck assembly of claim 1, further comprising a box cover which is selectively secured to the drawer to close the drawer.

3. The deck assembly of claim 1, further comprising a plurality of hanging brackets for coupling the plurality of pipes to the underside of the trailer.

4. The deck assembly of claim 1, wherein the plurality of deck members include members constructed from plywood and aluminum with a decorative outer carpet.

* * * * *